United States Patent
Ambrefe, Jr. et al.

(10) Patent No.: US 9,704,311 B2
(45) Date of Patent: Jul. 11, 2017

(54) METHODS AND SYSTEMS FOR EFFICIENT SECURITY SCREENING

(71) Applicant: SecurityPoint Holdings, Inc., St. Petersburg, FL (US)

(72) Inventors: Joseph T. Ambrefe, Jr., Indian Rocks Beach, FL (US); Douglas J. Linehan, Beverly, MA (US)

(73) Assignee: SecurityPoint Holdings, Inc., St. Petersburg, FL (US)

( * ) Notice: Subject to any disclaimer, the term of this patent is extended or adjusted under 35 U.S.C. 154(b) by 0 days.

(21) Appl. No.: 14/806,532

(22) Filed: Jul. 22, 2015

(65) Prior Publication Data

US 2015/0325068 A1    Nov. 12, 2015

Related U.S. Application Data

(63) Continuation of application No. 14/088,517, filed on Nov. 25, 2013, now abandoned, which is a continuation of application No. 12/411,991, filed on Mar. 26, 2009, now abandoned.

(60) Provisional application No. 61/040,425, filed on Mar. 28, 2008.

(51) Int. Cl.

| G08B 13/00 | (2006.01) |
|---|---|
| G05B 19/00 | (2006.01) |
| G05B 23/00 | (2006.01) |
| G07C 9/00 | (2006.01) |
| G06Q 30/02 | (2012.01) |
| B64F 1/36 | (2017.01) |
| G07C 11/00 | (2006.01) |

(52) U.S. Cl.
CPC .......... *G07C 9/00071* (2013.01); *B64F 1/366* (2013.01); *G06Q 30/0244* (2013.01); *G07C 9/00158* (2013.01); *G07C 11/00* (2013.01)

(58) Field of Classification Search
CPC ......... G07B 15/00; A61B 5/024; B64F 1/366; G06Q 30/0277; G07C 9/00087; G07C 9/00031; G07C 9/00103; G07C 9/0007; G07C 9/00166; G08B 13/2417; G08B 13/2448; G08B 13/2462; G08B 25/014; G08B 25/016
USPC ............. 340/5.2, 5.8, 573.1, 541, 5.21–5.28; 705/52
See application file for complete search history.

(56) References Cited

U.S. PATENT DOCUMENTS

| 5,978,770 | A * | 11/1999 | Waytena | G06Q 10/02 705/5 |
|---|---|---|---|---|
| 6,507,278 | B1 * | 1/2003 | Brunetti | B64F 1/366 340/5.3 |
| 7,126,470 | B2 * | 10/2006 | Clift | G06K 17/00 340/10.1 |
| 7,801,629 | B2 * | 9/2010 | Hale | G06Q 10/02 340/4.6 |
| 7,840,435 | B2 * | 11/2010 | Robertson | G06Q 10/04 705/7.16 |

(Continued)

Primary Examiner — Hoi Lau
(74) Attorney, Agent, or Firm — Sheppard, Mullin, Richter & Hampton LLP (57) ABSTRACT

The present invention relates to systems and methods relating to security checkpoints. In some embodiments the present invention includes a security checkpoint system that is optimized in one or more of design and decor, audio characteristics, and efficiency in passing customers through the security checkpoint and generating revenue with advertising and sponsorships.

24 Claims, 3 Drawing Sheets

(56) References Cited

U.S. PATENT DOCUMENTS

| | | | |
|---|---|---|---|
| 9,116,513 B2* | 8/2015 | Ambrefe, Jr. | G07C 9/00087 |
| 9,516,460 B2* | 12/2016 | Ambrefe, Jr. | H04W 4/02 |
| 2002/0145505 A1* | 10/2002 | Sata | G07B 15/00 340/5.2 |
| 2004/0098237 A1* | 5/2004 | Pendergraft | G06Q 10/04 703/7 |
| 2004/0174263 A1* | 9/2004 | Sata | G07B 15/00 340/573.1 |
| 2005/0065834 A1* | 3/2005 | Hale | G06Q 10/02 700/83 |
| 2006/0100922 A1* | 5/2006 | Odemis | G06Q 30/0277 705/14.73 |
| 2007/0046426 A1* | 3/2007 | Ishibashi | G07C 9/00087 340/5.52 |
| 2007/0109134 A1* | 5/2007 | Dugan | G07C 9/00111 340/573.1 |
| 2007/0222620 A1* | 9/2007 | Trammell, III | G01V 11/00 340/573.1 |
| 2007/0290843 A1* | 12/2007 | Manneschi | G01T 1/167 340/540 |
| 2008/0261510 A1* | 10/2008 | Lin | G06Q 10/06 455/3.01 |
| 2009/0270693 A1* | 10/2009 | Hyde | A61B 5/024 600/301 |
| 2009/0284343 A1* | 11/2009 | Ambrefe, Jr. | G07C 9/00158 340/5.2 |
| 2010/0039259 A1* | 2/2010 | Hazzani | G07C 9/00087 340/541 |
| 2010/0078475 A1* | 4/2010 | Lin | B64F 1/366 235/380 |
| 2010/0211442 A1* | 8/2010 | Venkataraman | G06F 17/30029 705/14.5 |
| 2013/0223678 A1* | 8/2013 | Brunetti | G06K 9/00778 382/103 |
| 2014/0070946 A1* | 3/2014 | Ambrefe, Jr. | H04W 4/02 340/541 |
| 2014/0085047 A1* | 3/2014 | Ambrefe, Jr. | G07C 9/00158 340/5.52 |
| 2014/0104034 A1* | 4/2014 | Ambrefe, Jr. | G07C 9/00087 340/4.4 |
| 2015/0066519 A1* | 3/2015 | Lin | G06Q 50/10 705/1.1 |
| 2015/0325068 A1* | 11/2015 | Ambrefe, Jr. | G07C 9/00158 705/14.43 |
| 2017/0034653 A1* | 2/2017 | Ambrefe | H04W 4/02 |

* cited by examiner

METHODS AND SYSTEMS FOR EFFICIENT SECURITY SCREENING

CROSS-REFERENCE TO RELATED APPLICATIONS

This application is a continuation of U.S. Nonprovisional patent application Ser. No. 14/088,517, filed Nov. 25, 2013 and entitled "METHODS AND SYSTEMS FOR EFFICIENT SECURITY SCREENING", which is a continuation of U.S. Nonprovisional patent application Ser. No. 12/411,991, filed Mar. 26, 2009 and entitled "METHODS AND SYSTEMS FOR EFFICIENT SECURITY SCREENING", which claims priority, under 35 U.S.C. §119, to provisional U.S. Application Ser. No. 61/040,425, filed Mar. 28, 2008 and entitled "METHODS AND SYSTEMS FOR EFFICIENT SECURITY SCREENING", all of which are hereby incorporated by reference.

FIELD OF THE INVENTION

The present invention relates to a security checkpoint. More particularly, the present invention relates to systems and methods for efficient and optimized security screening of people and personal belongings at a security checkpoint.

BACKGROUND OF THE INVENTION

As various threats to safety have developed and evolved, the importance of security has increased. An unfortunate side-effect of increased security has been, at least so far, increased inconvenience. The inconvenience manifests itself in various ways, including lost time, confusion, anxiety, increased stress, intimidation, and/or general lack of comfort. Security checks often occur at a security checkpoint. Such security checkpoints are now present at various private and government-owned buildings, travel facilities, and other places. One way of reducing the downside of increased security may be improving, enhancing and/or optimizing various environmental or atmospheric conditions and other aspects of security checkpoints. At present security checkpoints are often thrown together in a utilitarian manner utilizing only readily available materials and technologies, primarily focused only on technology and function and other factors are partially or wholly discounted and/or ignored.

SUMMARY OF THE INVENTION

In some embodiments, the systems and methods will provide an enhanced customer experience at security checkpoints by improving atmospheric conditions. In other embodiments, the systems and methods will provide enhanced security at security checkpoints. In further embodiments the systems and methods will provide enhanced security while providing an enhanced customer experience at the security checkpoint. In some embodiments the security checkpoint is a checkpoint for persons about to travel. In some instances a person is passing from a non-secure area into a secure area.

In some embodiments the present invention is a system or method of managing the set-up and/or maintenance of a security checkpoint or a set of security checkpoints. In some embodiments such management would facilitate the selection and integration of optimal atmospheric conditions, environment, technology, materials and/or advertising. In some embodiments the security checkpoint may be designed with the goal of establishing a seamless combination of form and function to deliver high security in an inviting atmosphere designed, deployed, maintained and updated with form equal to function to maximize available technology and the unique space or footprint associated with each environment. Doing so may enhance the customer experience, available technologies and the security process. In some embodiments the management may also generate revenue for the entity that runs the checkpoint or security area. In some such embodiments the security checkpoint may become a self-funded security enhancement focused on customer service.

In some embodiments the present invention is a system. In some such embodiments the present invention is a security checkpoint system that includes a line management system or queuing process; an identification checking station, a security station(s); and a recomposure station; wherein the security checkpoint is optimized with respect to one more aspects selected from the group consisting of design and decor, audio characteristics, information presentation, and efficiency in passing customers through the security checkpoint. In certain embodiments the line management or queuing system is configured to perform one or more functions selected from the group consisting of minimizing customers' time on line, providing appointments for customers' security checkpoint appearance, tracking one or more customers' progress, calculating and communicating wait times, increasing throughput at the security checkpoint, providing information, and diverting one or more customers to other security checkpoints and/or screening stations having lesser wait times. In certain embodiments, the system also makes accommodations for special security process lanes including but not limited to Registered Travelers, frequent or preferred or premium customers, employees, and/or customers having an appointment. In other embodiments the identification checking station is configured to perform one or more functions selected from the group consisting of verification of the authenticity of an ID identifier and determining whether a customer is a person of interest. In further embodiments the security station comprises one or more elements selected from the group consisting of a screening device and a remote security station. In certain embodiments the remote security station includes remote personnel with high or special skill in interpreting images. In some embodiments such remote personnel interpret results of technology images such as x-rays. In some embodiments the recomposure station comprises one or more elements selected from the group consisting of a specifically designed shelf, a table, a bench, and a leaning post or rail to facilitate a customer's replacement of his/her shoes or articles of clothing with minimal time and maximum efficiency to recompose so the customer promptly moves on and away from the checkpoint relieving a common chokepoint.

In certain embodiments the security checkpoint is optimized with respect to design and decor taking into account architectural design and local preferences as well as federal, state and local security requirements and wherein the optimization comprises one or more elements selected from the group consisting of integrating the design of the security checkpoint with other areas of the facility, creating a decor and design of a security checkpoint that is substantially similar to a security checkpoint at another location, utilizing a color scheme and atmospheric conditions that has a positive effect on customer behavior in and around the security checkpoint, ensuring that various security checkpoints—that may have a different theme or color combination than one another—have a recognizable commonality such that they may each have a certain familiarity to a customer, and utilizing design materials with the objective that they have a positive effect on customer behavior and/or emotion in and around the security checkpoint. In other embodiments the security checkpoint is optimized with respect to audio characteristics and wherein the optimization comprises one or more elements selected from the group consisting of reduction of extraneous noise in and around the security checkpoint, communicating audio instructions at optimal sound levels and using a voice that has a positive and/or calming effect on customer behavior in and around the security checkpoint and playing music or sounds that have a positive effect on customer behavior in and around a security checkpoint. In some embodiments the positive effect is calming and causes a heightened awareness and/or increased receptivity to stimuli. In some embodiments the security checkpoint is optimized with respect to communication or transfer of information and wherein the optimization comprises one or more elements selected from the group consisting of reducing provision of extraneous information, modifying the type or category of advertising presented, segmenting the content of advertising presented to align with the customer demographics at various times throughout the day, modifying the frequency or volume of advertising presented, modifying the placement of advertising and use of integrated signage using standards of environmental graphics and environmental engineers as well as interior and architectural design. In other embodiments the security checkpoint is optimized with respect to efficiency in passing customers through the security checkpoint and wherein the optimization comprises one or more elements from the group consisting of optimization of decor and design, optimization of audio characteristics, optimization of customer service, and optimization of information presentation.

In yet other embodiments the present invention includes a security checkpoint system including: integrated signage configured to provide one or more of the group consisting of advertising, travel information, checkpoint information, instructions for the security process, creating an identity for the facility; an identification checking station, wherein the identification checking station is configured to perform one or more functions selected from the group consisting of verification of the authenticity of an ID identifier or biometric verification and determining whether a customer is a person of interest; security station(s), wherein a customer or an item in customer's possession is inspected; and a remote security station, wherein said remote security station inspects the customer or an item in customer's possession and may be redundant to an on site officer; wherein the security checkpoint system is optimized with respect to one more aspects selected from the group consisting of design and decor, audio characteristics, information presentation, and efficiency in passing customers through the security checkpoint.

In some embodiments the present invention is a method. In some such embodiments the present invention is a method including: optimizing a security checkpoint with respect to one more atmospheric conditions or aspects selected from the group consisting of design and decor, architectural design, environmental graphics, local preferences, federal, state, and local security requirements, audio characteristics, olfactory characteristics, information display, and efficiency in passing customers through the security checkpoint, wherein said optimizing may occur at one or more of the group selected from a line management system, an identification checking station, screening technology; and a recomposure station of the security checkpoint.

In other embodiments the present invention is a method including: optimizing the presentation of signage including advertising at a security checkpoint, wherein the optimizing includes one or more elements selected from the group consisting of modifying the category of advertising presented, segmenting the category of advertising presented, modifying the content of advertising presented, modifying the amount of advertising presented, modifying the placement of advertising and use of integrated signage to provide advertising, and analyzing usage of a security checkpoint with respect to one or more aspects selected from the group consisting of date, time, volume, checkpoint staffing level, security threat level, customer flow, and customer demographics.

DETAILED DESCRIPTION OF THE EMBODIMENTS

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

DEFINITIONS

A "customer" is a person who is proceeding through a security checkpoint and/or a person who is about to proceed through a checkpoint from a non-secure area to a secure area.

An "ID identifier" is a document or biometric measure that provides a picture and/or other personal information of the holder sufficient to identify the holder. Examples include but are not limited to a driver's license, a state issued identification card, and a foreign or United States passport and other federal, international or privately issued documents recognized and accepted for positive identification. Biometric measure may include finger prints, facial recognition and/or retinal scanning.

An "RFID" tag is an object that can be applied to or incorporated into a person or thing for the purpose of identification or monitoring of that person or thing using radiowaves.

A "security checkpoint" may be any place designed to enhance security by interactions with people and or technology. For example a security checkpoint may be a place where a person is questioned, observed, inspected, scanned and/or otherwise checked and/or a person's items and/or belongings are inspected, scanned and/or otherwise checked. The security checkpoint includes the non-secure areas where customers line up or begin preparing to enter or enter the queue to enter the security area, the area where customers exit the checkpoint in a secure area, and all areas in between. Such security checkpoints may be found at privately-owned buildings, government-owned buildings, travel facilities, sporting events, museums or galleries, concerts, or the like. Design and layout may vary based on type of facility, age of the technology and limits of the environment and federal, state and local policy.

A "travel facility" is any place where persons go to travel from one place to another. Examples include airports, train stations, bus stations, subway stations, cruise terminals and tram or trolley stations.

A "master plan" refers to a plan or guidelines outlines the principals that guide all atmospheric conditions including environmental graphics, security objectives, federal, state and/or local regulations, local objectives, vision and advertising. The master plan also provides for oversight of the program and a single point of contact for coordination of all stakeholders including the TSA, airport management, security checkpoint management, and customers.

The "TSA" is the United States Transportation Security Administration.

The words "satellite receiver" when used in the context of the present invention, include any device capable of receiving data from a satellite and capable of sending the received data to another device.

The words "satellite uplink station" when used in the context of the present invention, include an apparatus capable of transmitting data to a satellite.

The word "controller" when used in the context of the present invention, includes any device capable of controlling the individual devices of the present invention, including receiving data from a satellite receiver, and/or sending data to a storage device, and/or receiving data from a storage device, and/or sending data to at least one video display. Additionally the controller may communicate with a GPS system and perform programming instructions.

The words "storage device" when used in the context of the present invention, include any device capable of storing analog or digital data received from the satellite receiver and storing any controller programming instructions. The storage device may also include a device that communicates with a controller by receiving controller requests for data and sending the appropriate data to the controller. The storage device may be any known storage media known in the art.

The words "video signal processor" when used in the context of the present invention, include any device capable of processing a single video signal for presentation across a video display matrix, by receiving, from wireless or non-wireless means, a single video signal, processing the signal for, and sending a video signal to each video display unit in a video display matrix, each signal representing a portion of the video to display on a single video display unit.

The words "programming instructions" when used in the context of the present invention, include computer executable code that when operated or followed by a controller instruct the controller to display, receive, and/or organize video data including, among others, display durations, start times, stop times, real time overrides, and/or location-specific start and stops.

"Information" when used in the context of the present invention includes any information that may be beneficial to a customer and/or the facility operating the security checkpoint and/or the person or entity overseeing operation of the security checkpoint. Examples of information include, but are not limited to, advertising, travel, directions, instructions, news, information, information relating to the security checkpoint, facility and national matters of interest, and/or entertainment.

"Advertising" when used in the context of the present invention includes sponsorship and any communication or display of information, and specifically third party information, which may, in one aspect, relate the sale of goods and/or services. In one aspect, "Advertising" may be in exchange for a fee, remuneration and/or compensation of any kind, including money and/or services.

"Atmospheric conditions" when used in the context of the present invention include the cleanliness, layout, design, auditory stimuli, environmental graphics, olfactory stimuli, textures and colors at and around the checkpoint.

The words "video data" when used in the context of the present invention, include any combination of electronically or magnetically recorded information that may be converted or presented on a screen, monitor or projected onto a surface and may be analog or digital.

The words "communicating", "coupled", "association" and any derivation thereof relate to the interaction between two devices and include both wireless and non-wireless means.

The words "sending", "receiving", and any derivation thereof include both wireless and non-wireless means.

Embodiments of the Present Invention

General

Certain embodiments of the present invention may provide cost savings, in particular to those hosting the security checkpoint and to the government agencies (e.g., the TSA) or private companies that may be responsible for staffing or supervising the security checkpoint. Such cost savings may come in the form of increased efficiency of personnel, reduction of on the job injuries, reduction of insurance claims for injured workers, reduction of personnel, increased automation, and/or enhanced retention of personnel.

Certain embodiments of the present invention may provide increased efficiency at security checkpoints. Such increased efficiency may include enhancing the experience of customers proceeding through the security checkpoint, passing customers through the security checkpoint in a more efficient and faster manner, decreasing the amount of time customers spend in line, and/or decreased mistakes (e.g., false positive or false negative screening results), heightened alertness of personnel, customers more attune to and open to stimuli including directions and improved moral and mood of customers and personnel.

In some embodiments security checkpoints may be said to have certain areas or aspects including one or more of (1) the general set-up, architectural design, layout and decor of the checkpoint; (2) the line and queue area where customers prepare to proceed through the security checkpoint; (3) identification checking/verification where the customer's identification is checked and/or verified; (4) divesting, where customers divest themselves of personal belongings and/or luggage for screening by available technology; (5) the security, the actual checking/inspection of customers and/or their belongings; (6) recomposure or exit, where customers collect any personal belongings/luggage and other materials and vacate the security checkpoint; and (7) secondary screening where customers are subjected to additional or redundant questioning/inspection. See, e.g., FIGS. 1-3.

Figure 1:
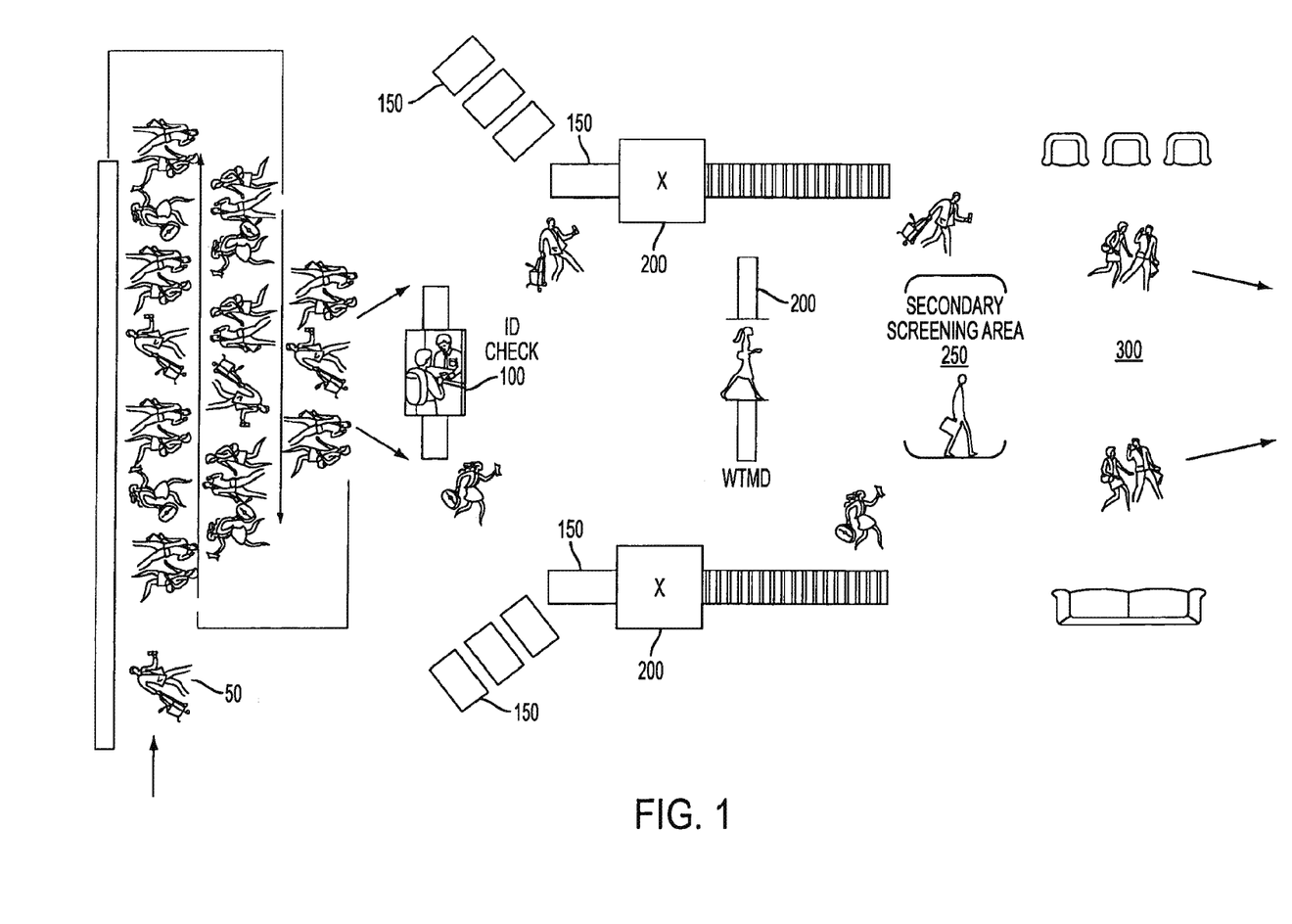
FIG. 1 is an illustration of an embodiment of an exemplary security checkpoint.

For example FIG. 1 shows an exemplary security checkpoint having line or queuing area 50, ID checking station 100, divesting areas 150, security stations 200, secondary screening area 250, and recomposure area 300. Of course, various embodiments may not have each element present in FIG. 1 and various elements will have a configuration of elements that differs from that depicted in FIG. 1, for example as available technology changes certain areas may evolve or become extraneous.

Figure 2:
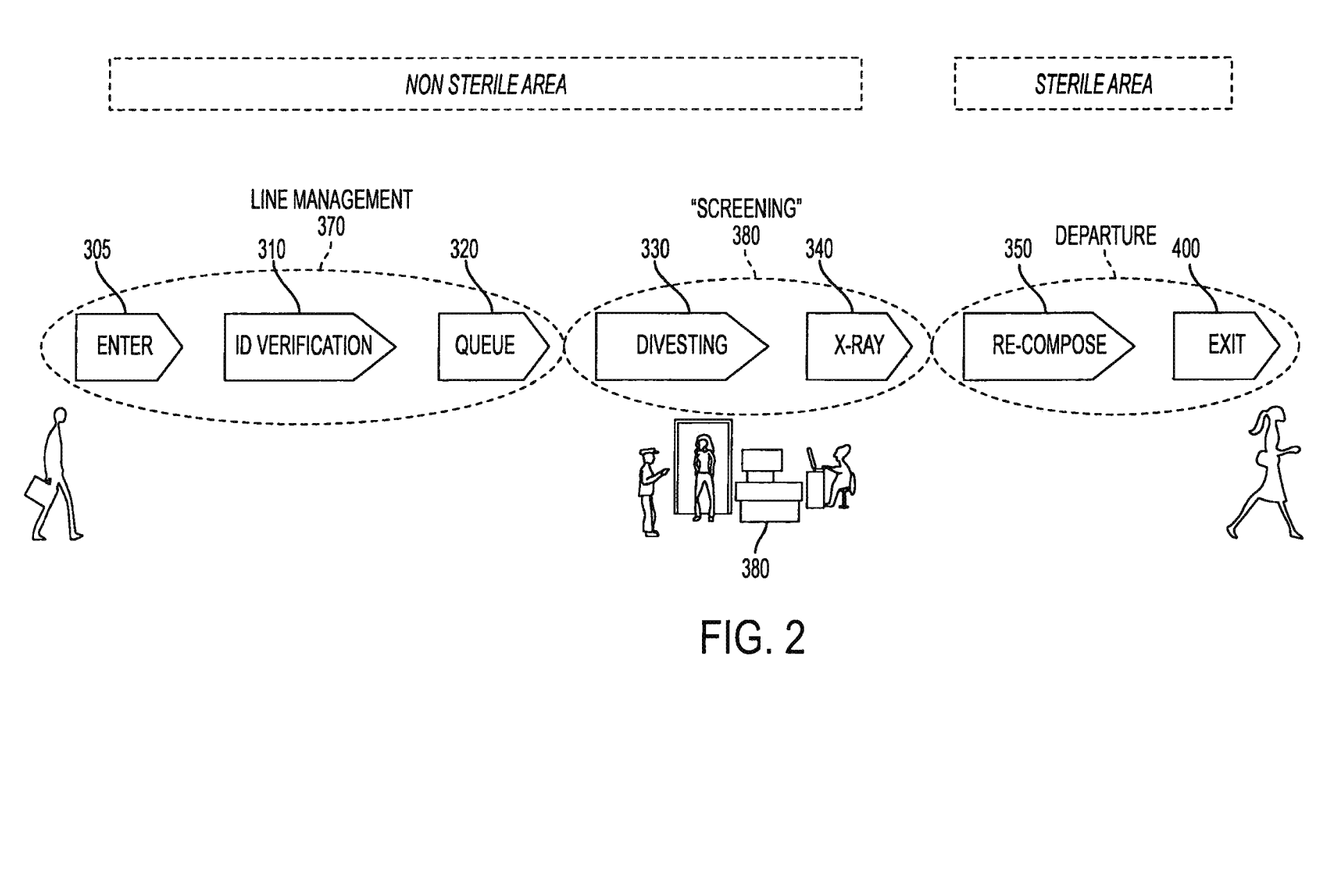
FIG. 2 is a block diagram showing an exemplary security checkpoint.

FIG. 2 illustrates an exemplary security checkpoint. FIG. 2 depicts line management and queuing system 370 which encompasses entry 305, ID verification 310, and queue (or line) 320. FIG. 2 also depicts security screening 380, which includes divesting area 330 and screening devices and technology 340. FIG. 2 further illustrates recomposure area 350 and exit 400.

Figure 3:
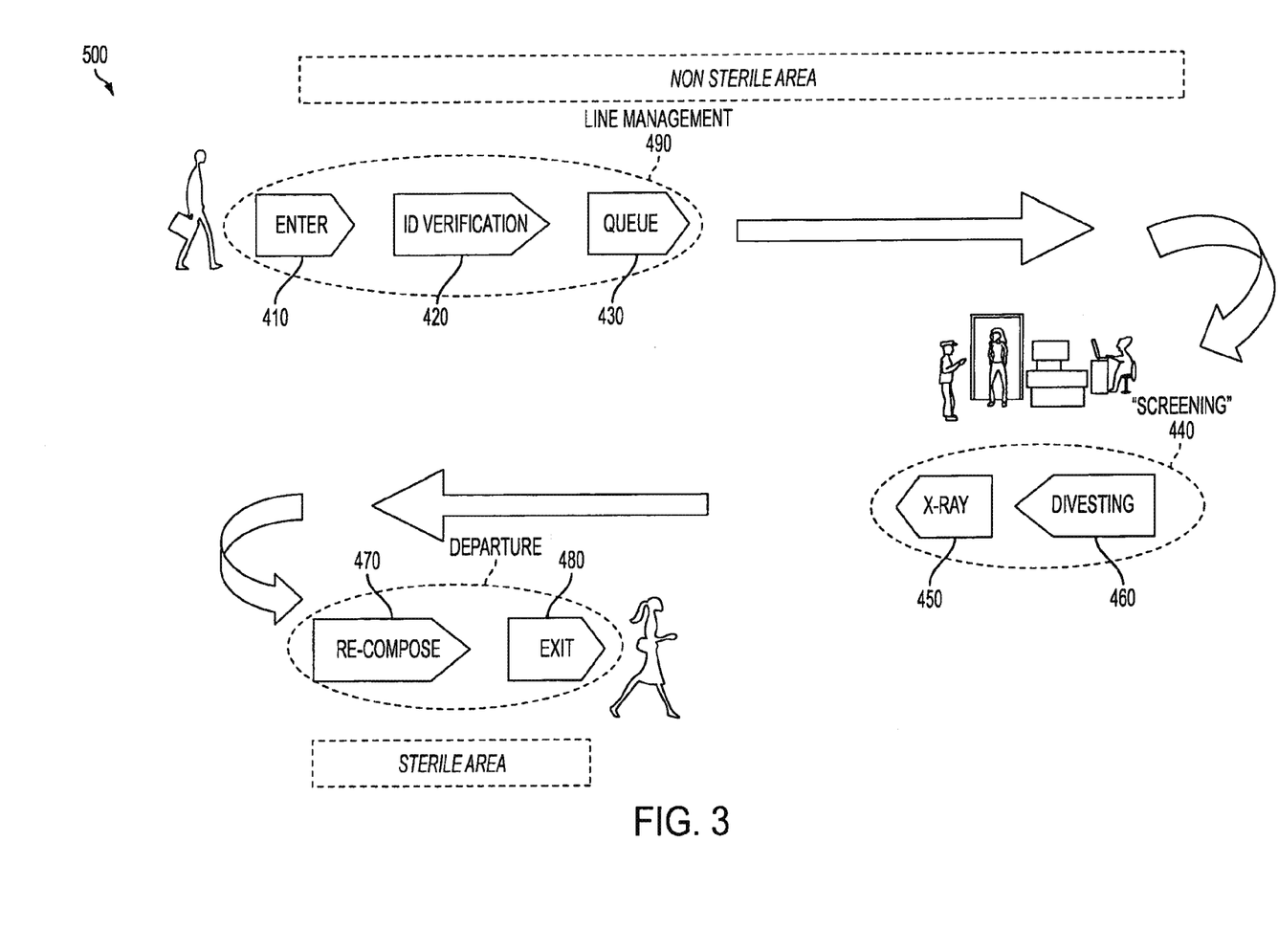
FIG. 3 is a flow chart showing an exemplary progression through a security checkpoint.

FIG. 3 illustrates an exemplary paths or steps that a customer may take through a security checkpoint. Customer 500 first enters 410 the line management and queuing system 490 of the security checkpoint. Customer 500 next has his/her ID checked 420 and proceeds through queue 430 toward security station 440. At or around security station 440, customer 500 divests 450 him or herself of any personal items and those items and customer 500 are scanned or screened with available technology 460. After proceeding through the security station 440, customer 500 recomposes 470 by collecting his/her items and preparing to move to their primary destination including repacking and placing articles of clothing or jewelry back on. After recomposing 470, customer 500 exits 480 the security checkpoint on the secure side.

In some embodiments the present invention includes or utilizes a security checkpoint that is optimized in various characteristics. In some embodiment the design and/or decor are optimized to enhance the customers' experience at the security checkpoint. In certain embodiments the audio characteristics of the security checkpoint may be optimized to enhance the customers' experience in moving through the security checkpoint. In other embodiments the organization of the security checkpoint, including signage, communication of information and directions and the like are optimized to enhance the customers' experience at the security checkpoint. In yet other embodiments olfactory, auditory, emotive and/or tactile aspects of the security checkpoint are optimized.

In further embodiments the security checkpoint may be ergonomically optimized to reduce injuries to customers and/or personnel at the security checkpoint. In some such embodiments include materials to enhance the comfort and/or safety of the security checkpoint personnel. In some such embodiments antifatigue mats are used. In some such embodiments the antifatigue mats are improved or enhanced, for example, by having padding and/or non-slip or non-skid surfaces that are more durable and designed specifically for the checkpoint environment.

In some embodiments the security checkpoints of the present invention may use tracking technology. In some embodiments the tracking technology will track a customer and/or one or more of the customer's personal items and/or components of the security system such as divesting trays through the security checkpoint. In some such embodiments the tracking technology will match a particular customer to one or more of that customer's personal items. In some embodiments the tracking technology may be used to monitor approximate wait times for customers in a particular security checkpoint. In some such embodiments that information may be communicated to other customers via various means including public signage, email and mobile text messaging. In some embodiments the tracking technology may be an RFID tag, a visual tag, or other similar tag.

Optimization of Sensory Aspects

Various studies have shown that individuals, crowds, and crowd flow are affected by their environment. For example, the visual, audio, olfactory and/or tactile aspects of an individual's or a crowd's environment affect the manner in which that individual and/or that crowd behave and receptivity individual and/or crowd to external stimuli such as signage. In some embodiments the present invention includes a security checkpoint optimized in its sensory presentation to a customer such that a customer's behavior, mood and/or attitude is positively affected. In some embodiments the positive effect is one or more of a relatively calm demeanor, being more receptive to instruction and guidance, a decrease in anxiety, a decrease in stress, level of alertness, awareness of threat levels, increased efficiency and/or speed in progressing through the security checkpoint. In some embodiments one or more of the security checkpoint's visual, audio, olfactory and tactile aspects are optimized.

Olfactory Optimization

In some embodiments the security checkpoint's olfactory aspects are optimized. In certain embodiments the security checkpoint is sanitized to remove offensive or disruptive scents. In some such embodiments a fragrance and/or air freshener is dispensed in all or a portion of the security checkpoint. In some such embodiments, the fragrance or air freshener is a fragrance comprising one or more volatile organic compounds which are available from perfumery suppliers such as Firmenich Inc, Takasago Inc, Noville Inc., Quest Co., International Flavors & Fragrances, and Givaudan-Roure Corp. Most conventional fragrance materials are volatile essential oils. The fragrance can be a synthetically formed material, or a naturally derived oil such as oil of Bergamot, Bitter Orange, Lemon, Mandarin, Caraway, Cedar Leaf, Clove Leaf, Cedar Wood, Geranium, Lavender, Orange, Origanum, Petitgrain, White Cedar, Patchouli, Lavandin, Neroli, Rose absolute, and the like.

A wide variety of chemicals are known for perfumery, such as aldehydes, ketones, esters, alcohols, terpenes, and the like. A fragrance can be relatively simple in composition, or can be a complex mixture of natural and synthetic chemical components. Synthetic types of fragrance compositions either alone or in combination with natural oils are described in U.S. Pat. Nos. 4,324,915, 4,411,829; and 4,434,306, which are incorporated herein by reference. Other artificial liquid fragrances include geraniol, geranyl acetate, eugenol, isoeugenol, linalool, linalyl acetate, phenethyl alcohol, methyl ethyl ketone, methylionone, isobornyl acetate, and the like.

A liquid fragrance may also be formed into a thixotropic gel by the addition of a thickening agent, such as a cellulosic material, a polymeric thickener, or a fumed silica of the type marketed under the Cabosil trademark by Cabot Corporation. A fragrance ingredient can also be in the form of a crystalline solid, which has the ability to sublime into the vapor phase at ambient temperatures A crystalline fragrance starting material can be selected from organic compounds which include vanillin, ethyl vanillin, coumarin, tonalid, calone, heliotropene, musk xylol, cedrol, musk ketone benzophenone, raspberry ketone, methyl naphthyl ketone beta, phenyl ethyl salicylare, veltol, maltol, maple lactone, proeugenol acetate, evemyl, and the like. This type of fragrance can contribute a long term air-treatment capability to an air freshener dispenser device for use with the devices disclosed herein.

Tactile Optimization

In some embodiments the tactile feel of the security checkpoint is optimized. In some embodiments materials are used that encourage customers to proceed through the security checkpoint in an efficient manner. In some embodiments one or more components of the security checkpoint are integrated with laminates or coverings to establish a deliberate design and decor to the checkpoint and serve to soften the harsh or cold components of a security checkpoint and have a positive effect on customer's mood. Components that may be so integrated include the walls and wall coverings, the floor and floor coverings, various current and future technologies including but not limited to x-ray machines, walk through metal detectors, trace element sensors or "puffer" machines, millimeter wave booths, tables, chairs, kiosks, permanent and temporary partitions, and/or private and semi private secondary screening areas including any area a customer sees or has contact with.

Audio Optimization

Sound can also impact moods. Likeable and familiar music can induce good moods, whereas discordant sounds can create bad moods and elevate tension. Slow tempo sounds sooth while a quicker tempo increases urgency. In some embodiments a security checkpoint's audio aspects are optimized and sounds may be segmented based on the position in the checkpoint; calming at the start of a long wait and a quicker tempo as the customer is preparing to be screened and when recomposing. In some embodiments the security checkpoints of the present invention utilize noise reduction technology and/or an audio communications system that provides a calming influence. In some embodiments the noise reduction technology is the use of materials that reduce or prevent hard plastic to plastic or metal to metal or metal to plastic contact. In some embodiments the noise reduction technology is used in floors, ceilings and/or walls such that sounds are minimized and/or softened or deadened. In other embodiments the noise reduction technology includes wrapping or covering certain elements of the security checkpoint to temper the sounds of various elements contacting each other.

In some embodiments the audio aspects are optimized by broadcasting sounds. In some such embodiments the broadcasted sounds are optimized. White noise can be generated with a digital sound synthesizing device. Sound designers, with some processing and filtering, can create a multitude of effects such as wind, rain, waterfall or surf. Some such embodiments use a high-quality speaker system that provides substantially clear sound at decibel levels that are appropriate for the particular checkpoint. In some embodiments the voice used to provide information is one that is generally soft and generally pleasant. In some embodiments music is played. In particular, music can influence physical behavior. Fast music may energize consumers. In some such embodiments the music is soothing and/or calming to the average person. Slow music can be soothing. The type of music you play can have dramatic and direct effects. For example, a fast tempo is more desirable in restaurants because customers will eat faster, thus allowing greater table turnover and higher sales. In some embodiments the sounds are transmitted over head while in other embodiments the sounds are delivered in close proximity to the traveler such as within the line management stanchions and may be interactive allowing for customer selection of instructions or sound type.

Visual Optimization

In some embodiments the security checkpoint is optimized in its visual appearance. Such optimization may include one or more of the use of certain materials, the physical design and organization of the security checkpoint (including providing a design that reduces clutter and gives the security checkpoint a more open/airy feel to the customer), the advertising and/or information presented at the security checkpoint, the colors presented at the checkpoint, and the uniforms/clothing worn by personnel at the checkpoint.

In certain embodiments the present invention includes development of a master plan or guidelines designed specifically for a security checkpoint to integrate all visual elements. In some embodiments the signage is governed by guidelines to maximize customer comprehension and observation of key information. In some embodiments such guidelines include reduction of information, as too much information and too many graphics at key points may serve only to confuse and frustrate the customer such that they are ultimately blocked-out by the customer. In some embodiments the security checkpoint components will have a specific design style such as the use or faux marble, wood, leather and such to convey a sense of style and purpose. The use of visual optimization elevates the necessary process of security screening while recognizing the customers importance and supporting customer service efforts and engendering goodwill.

In some embodiments the security checkpoint has a decor and design that is consistent with federal, state and local laws, rules and/or requirements, the architectural design, local preferences and decor of other parts of the facility such that the security checkpoint appears to be integrated with the facility's other parts. In other embodiments the security checkpoint has a decor and design that utilizes colors, materials and/or sounds that promote a calm demeanor among customers. In some such embodiments portions or all of various metal/concrete devices or structures are covered or wrapped such that their appearance is softened. In some such embodiments color is used and changed to encourage certain behaviors or emotions in customers. Preferably, a security checkpoint of the present invention will utilize colors and/or decor that present an authoritative, yet not intimidating or cold, atmosphere at the security checkpoint. In some embodiments, the decor include faux marble, leather, wood grains and the like.

In certain embodiments the visual and environmental optimization also enhances the security function of the security checkpoint. For example, establishing a calming environment may have an enhanced calming effect on otherwise nervous, anxious, or stressed but innocent customer, and less of a calming effect on a nervous customer who is not innocent. For example, a person intending to commit a crime or intending to present a false ID identifier at the ID check may not be calmed by an otherwise calming environment. Such differential effect may permit enhanced identification of persons of interest and/or enhanced use of selective secondary or additional screening. In addition, a nervous person in a calming environment may be easier to spot with behavioral observation techniques.

In certain embodiments the security checkpoint has an overall decor and design that is similar to checkpoints in other locations. For example, an airport security checkpoint in San Diego, Calif. may have certain characteristics and elements that are similar to those at an airport security checkpoint in Boston, Mass. In other embodiments the overall decor and design is particular to one facility and may incorporate colors or other designs characteristic of area in which the facility is located. In some embodiments there is a familiarity established with the overall process while putting customers at ease there is sufficient unpredictability to keep bad elements from learning too much of the details of the system and using familiarity as predictability to plan for bad intent.

In some embodiments the security checkpoints of the present invention include one or more transparent glass panels. In some such embodiments the glass panels are used as partitions between parts of the security checkpoint (e.g., between the security station and the secondary screening area), between the security checkpoint and other parts of the facility (e.g., a pathway for customers leaving the facility), between security lanes within a security checkpoint and/or to define one more lines leading to the security station or to define the area between a common area or terminal area and the checkpoint. In some embodiments the glass panels are configured to display one or more of signage providing information, advertising and designs. In some such embodiments a projection film is applied to the glass. In some embodiments the projection film is 3M™ Vikuiti™ Rear Projection Film (a relatively flexible self-adhesive film that can be cut to various shapes and placed on transparent materials). In some embodiments the glass is substantially transparent at some times and at other times is displaying one or more of signage providing information, advertising and designs. In some embodiments the glass may be substantially transparent at some times and at other times is made to be substantially opaque for purposed of private screening or interviews. The use of such materials may also permit designated areas to be used for multiple purposes (e.g., for either recomposure or secondary screening) This provides for multiple uses of designated areas and is particularly beneficial where space is limited.

Colors

It is thought that certain colors have certain effects on persons and/or crowds. Thus, in some embodiment the decor and design of the security checkpoint, including any advertising or information displays, may be optimized in the colors presented. Color is thought to influence a person's moods and physical responses. When considering and evaluating color schemes for use in design, it may be useful to focus on color hues (e.g., warm and cool), degrees of color saturation (e.g., richness), and levels of depth (e.g., light or dark) as ways to influence customer perceptions. Color psychologists have found that warm colors (e.g., red, orange, and yellow) generally encourage activity and excitement, whereas cool colors (e.g., green, blue, violet) are more soothing and relaxing. Some have suggested that different social classes may have different perceptions and/or reactions to colors. For example, hot, bright colors are thought to have more appeal to lower-end markets, while deep, rich colors have historically appealed to higher-end markets.

Red may be associated with danger, passion, energy, warmth, adventure and/or optimism and may increase blood pressure, increase respiratory rate, aid digestion, and/or increase strength. Red may also inspire a sense of protection from anxiety and or fear. Red is generally thought to be a stimulant that increases energy. Use of red to accent certain features or aspects may cause persons to focus on that particular aspect or feature.

Blue may be associated with serenity, peace, sadness, loyalty, sincerity, trust, dependability, and/or justice and may lower blood pressure, slow respiratory rate, and be cooling, restful and/or relaxing. Some of the brighter blues may have a different, more exciting and dynamic effect on persons. In addition, too much blue may convey a lack of feeling and/or coldness.

Purple may be considered a mix of blue's generally calming influences and red's generally stimulating influences. Purple may be an uplifting or calming influence or may cause uneasiness.

Green may be associated with growth, nature, envy, inexperience, refreshment, birth, jealousy, wealth, and/or compassion and may cause rejuvenation, reduction of anxiety and nervousness, self-control, expansiveness, and/or enhanced balance. To some, green may symbolize nature and it is generally easiest on the eye and may be a calming, refreshing color. The natural greens, such as forest green, may be seen as tranquil and refreshing. Some greens, however, may convey negative thoughts of institutional power or illness.

Yellow may be associated with optimism, happiness, irritability, wisdom, cheer, annoyance, and/or warmth and may increase irritability, increase hostility, sharpen memory and/or concentration, aid digestion, stimulate circulation, and/or encourage communication. Yellow may be considered an optimistic color, but some believe people lose their tempers more often in yellow rooms, and babies will cry more. It is the most difficult color for the eye to take in, so it can be overpowering if overused.

Orange may be associated with activity, boldness, exuberance, cheer, and/or vigor and may decrease irritability, decrease hostility, and/or improve social behavior. It may also connect one to one's senses and help to remove inhibitions and make one independent and social. Orange generally causes a strong reaction, whether it is positive or negative.

Black may be associated with mourning, mystery, fright, elegance, dignity, sophistication, uncertainty, and/or intimidation and may cause fatigue. Black is generally thought to be the color of authority and power. Black's ability to cause strong emotions may make its overuse overwhelming for most.

White may be associated with joy, hope, purity, neutrality and/or cleanliness. White may aid mental clarity, cause purification of actions and thoughts, and/or encourage persons to clear clutter and obstacles.

Brown may be associated with earthiness, nature, tranquility, approachability, stability, reliability and/or safety. Brown may cause a sense of orderliness and wholesomeness.

Some put various colors and shades into groups and describe possible effects by group. Some identify four color groups as follows. The First group is clear, delicate warm colors containing no black, including scarlet, coral, peach, daffodil yellow, emerald green, sky blue, cobalt and lilac. These colors may be associated with light, warm, friendliness, new, youth, lively, fresh, clean and/or optimism. Some may associate these colors with negativity, and perceive them as insubstantial, frivolous and immature. The second group contains colors that are cool, contain more grey and, are delicate, but are not necessarily light. Examples include maroon, rose pink, grapefruit, sage, viridian, dove grey, some blues, delphinium and lavender. These colors may be associated with elegance, cool, calm, poise, graceful, upmarket, timeless, expensive, soothing, and aspirational. Some may interpret these colors to negatively convey draining, unfriendly, aloof and/or elitist feelings. The third group contains warm, but intense and fiery tones that generally have black mixed in. Examples include red, burnt orange, rust, butter yellow, leaf green, olive, teal blue, peacock and aubergine. The characteristics may be warm and friendly, traditional, solid, substantial, reliable, earthy, environmentally aware. The fourth group contains colors and tones that are strong and clear. Examples include black, white, crimson, magenta, lemon, jade green, ice blue, indigo and violet. Such colors may convey uncompromising excellence, material aspiration, efficiency, drama, sophistication, and a modern or high-technology feel. Some may perceive such colors as cold, uncaring, unfriendly, materialist, and expensive.

Advertising Optimization

In some embodiments the security checkpoints of the present invention optimize the display of advertising. In this context, optimization of advertising may involve one or more of displaying different advertising or segmenting directed to different demographics at different times, displaying different amounts in volume or frequency of advertising depending on the volume and/or flow of the traffic through the security checkpoint (e.g., replacing informational signage with advertising during key periods, such as periods of heavy travel such as Holidays or commuter travel periods), optimizing the audio and visual characteristics of the advertising presented (including integration of the audio and visual characteristics of the advertising with the audio and visual characteristics of the security checkpoint and/or facility as a whole) and/or coordinating the advertising presented in one part of the security checkpoint with advertising presented at other parts of the checkpoint (for example, coordinating advertising on the screens in one part of the security checkpoint with advertising on screens in other parts of the security checkpoint and/or coordinating the advertising on the screens with the advertising on the security trays, security carts, line stanchions, and/or other items in the security checkpoint and/or facility). Revenue generated can be shared with the facility or agency to offset the rising cost of security. Programs such as the SecureTray™ by SecurityPoint Media LLC have successfully demonstrated that such novel forms of advertising can expand the available market for advertisers, increase available revenue and provide a service that enhances the checkpoint experience.

In some embodiments the optimization of advertising provides a method of maximizing the amount of revenue that may be derived from any particular security checkpoint and/or facility. In some embodiments the advertising amount and content may be controlled through a facility remote to the security checkpoint and/or facility. In some embodiments the advertising content is controlled based upon real-time observations of conditions at a particular security checkpoint and/or facility. In some embodiments advertising is controlled via a satellite or wireless system. In some embodiments the advertising is altered or segmented to appeal to certain demographics. In this context a demographic may be a particular age group, a group traveling to a particular region or location, a group on a particular flight, a group that speaks a particular language, a group that practices a particular religion, a group having a particular income, leisure travelers, business travelers, or any similar grouping or persons or combinations thereof.

In some embodiments advertising is controlled via a satellite or wireless system. In one embodiment such a system comprises a satellite receiver in communication with a satellite uplink station, a controller couple with the satellite receiver, a storage device in association with the controller configured to store video data received from the controller via the satellite receiver, and at least one video display coupled with a controller. The video display may comprise one or more transparent glass panels, as described above. In another embodiment, the system further comprises at least one video signal processor coupled with a video display. In another embodiment, the system isolates one channel of a multi-channel video signal for presentation on at least one video display. The invention may also isolate at least one channel of a multi-channel video signal for storage in the storage device. In alternative embodiments, the system may further comprise a speaker system associated with the video display for broadcasting audio.

In a further aspect of the invention, the system may display live satellite broadcasts obtained from the satellite uplink station via the satellite. The video display may be remotely interrupted via satellite. The interruption may comprise flight alerts such as arrival or departure times and delays, news, weather reports, terrorism threats, traffic reports, or security warnings. The interruption may be video data that is live video data, recorded video data, or video data stored in the storage device.

In another embodiment, the controller may receive programming instructions from the uplink station via the satellite. The programming instructions may include start time of a video signal, end time of a video signal, geographic location in which to display video data, received channels of which to store in the storage device, program override, display a live signal, or commands to display sequence of a series of video files.

In yet another embodiment, the controller sends video data to the video display via wireless networking, Bluetooth technology, coaxial cable, WiFi, WiMAX, DSL, ISDN, RCA cables, the internet, or an intranet. In a further embodiment, the controller and storage device may send data to and store data for a plurality of video signal processors and a plurality of video displays.

Another embodiment of the present invention provides methods for selecting advertising or programming to display on the video displays at or around the security checkpoints. The method may include communicating the geographic location of the video display to the controller. The system may also include a plurality of video display units in one video display. The programming may be commercial advertising or programming and may be associated with a fee. A further embodiment provides a fee for commercial advertising or programming that may be determined by a number of variables such as the number of impressions or viewings, opportunity to see by customers, geographic location of the system, duration of the commercial advertising or programming, size of the video display used in the system, day of the week, time of day, and the number of other video displays in the system. Such a method may involve one or more of the demographics discussed herein.

Another embodiment of the present invention allows for corporate sponsorship of the checkpoint including but not limited to naming rights to generate revenue.

Another embodiment of the present invention allows for advertising on the surfaces within the checkpoint such as tables or floors or ceilings or components or technology or equipment and such.

Line Management

Security checkpoints frequently have a line of customers waiting to proceed through the checkpoint. In some embodiments the systems and methods of the present invention use one or more line management systems, physical and virtual queuing elements and/or methods as described herein.

In some embodiments the line management methods and/or systems include a physical arrangement that conveys the illusion that lines appear smaller or shorter than they actually are, which may, for example, reduce a customer's anxiety, fear, and/or stress. In some embodiments physical partitions are used that may obstruct the customer's view of the full line.

In some embodiments the systems and methods of the present invention utilize one or more customer service personnel. In some embodiments the customer service personnel perform only customer service functions. In some embodiments customer service personnel may have less training than other personnel at the security checkpoint. In some embodiments the customer service personnel are also trained to perform other functions at the security checkpoint. In other embodiments the customer service personnel may be conversant in two or more languages.

In some embodiments customer service functions include one or more of providing information, restocking various items that are provided to customers (e.g., plastic bags, booties), helping customers properly use such items, optimizing wait times, directing customers to different checkpoints within a particular facility, and directing customers to different lanes of a given security checkpoint. In some embodiments the provided information is one or more of travel information (e.g., flight times, gate information), approximate wait time, and information on how to proceed through the checkpoint (e.g., removal of shoes, removal of computers from bags). In some embodiments optimizing wait time includes restructuring of lines by moving elements that define the line (e.g., one or more stanchions connected by an element), directing customers to different security checkpoints, particular lanes within a security checkpoint, and providing instructions on how to proceed through the checkpoint. In some embodiments the customer service functions include maintenance, provision and/or supervision of security checkpoint resources. In some such embodiments the customer service function includes ensuring security trays are properly loaded (e.g., in a manner that provides an improved or optimal image to the security screening personnel) into the screening technology or device, ensuring a sufficient number of security trays are available to customers and are accessible to customers, ensuring that any security tray carts are properly used to ensure a supply of security trays for customers, aiding customers through and during the queuing and/or divesting processes and/or ensuring that sufficient resources are available to customers at the security checkpoint.

In some embodiments the customer service personnel have a uniform that differs from TSA personnel and/or other personnel at the security checkpoint. In some embodiments the uniforms are of a color that is thought to promote calmness or authority among others.

In some embodiments the present invention utilizes various forms of signage. In such embodiments the signage may convey any suitable information. In some embodiments the information may be one or more of flight or other travel information (e.g., gate information, departure times), information on how to proceed through the security checkpoint, and information advising customers to approach customer service personnel to ask questions or for other help. In preferred embodiments the signage is displayed on otherwise clear material, such as glass or certain plastics. Some such embodiments utilize a projection film such as 3M™ Vikuiti™ Rear Projection Film. In some such embodiments the signage may provide different information at different parts of the line. For example, there may be signage at the end of the line that provides customers with information regarding approximate wait times at different security checkpoints within the same facility. In some embodiments the signage may show real-time video of other security checkpoints within the same facility in sufficient detail to show how busy they may be. And in some embodiments the signage includes advertising.

In some embodiments the present invention utilizes an audio communication system. In some embodiments the audio communication system may provide sound throughout the security checkpoint. In other embodiments the audio communication system provides sound to only portions of the security checkpoint.

The audio communication system may provide any suitable content. In some embodiments the audio communication system may broadcast one or more of flight or other travel information (e.g., delays, change of gate information), information on how to proceed through the security checkpoint, and information advising customers to approach customer service personnel to ask questions or for other help. In some embodiments the audio is provided using high-quality speaker system that provides substantially clear sound at decibel levels that are appropriate for the particular checkpoint. In some embodiments the voice used to provide information is one that is generally soft and generally pleasant. In some embodiments the audio communication system may play music. In some such embodiments the music is soothing and/or calming to the average person. In some embodiments the sound system may broadcast different information to different parts of a line or security checkpoint. For example portions of a line that are ten minutes or more away from the security station may hear calming music, while those closer to the security station may hear instructions on how to proceed through the security checkpoint. In some embodiments the audio may include advertising messages.

In some embodiments other sources of information are available. In some embodiments a computer having a touch screen user interface is used. Such a computer may provide any suitable information to a customer. In some such embodiments the computer could provide information in various different languages (e.g., instructions on how to proceed through the security checkpoint, prohibited items, etc.), flight information, and/or security checkpoint information and directions to vendors, vendor locations, vendor specials for vendors located in the retail concession area of the facility in the secure side where applicable.

In some embodiments an appointment system is used. In some embodiments customers may contact a person or an automated system and set up an appointment at the security checkpoint. In some embodiments the appointment is free and in other embodiments customers may pay a fee for an appointment. In some embodiments the appointment is for a specific time. In other embodiments the appointment is for a time range. For example, the time range may be 5, 10, 15, 20, 25, 30, 35, 40, 45, 50, 55, 60, or 60 or more minutes. In some embodiments the appointments are for a particular security checkpoint and/or a particular security lane within a security checkpoint. In some embodiments there is a separate line at each security checkpoint for customers having such appointments. In some embodiments, fees paid for an appointment would be used to offset the cost of operating the checkpoint.

ID Checking

In some embodiments the ID checking station is merely a person or persons visually inspecting a person's ID identifier prior at a security checkpoint. Other embodiments utilize methods, technology and other elements to verify the identity and/or further investigate a customer passing through a security checkpoint. In some embodiments such methods/technology work in conjunction with technology associated with ID identifiers. For example, many ID identifiers have scannable bar codes, visual watermark or similar technology, an RFID tag, electronics, chips, or anything that aids one in verifying the authenticity of the ID identifier. In some embodiments a light source is applied to the ID identifier which makes visible an otherwise invisible visual watermark or similar visual cue. In some such embodiments a blue light is applied. In other embodiments a bar code reader is used to read a bar code on an ID identifier. In yet other embodiments magnification is applied to the ID identifier which makes visible an otherwise invisible visual watermark or similar visual cue. In other embodiments an RFID is detected and associated with a particular person. In some embodiments information from a person's ID identifier is entered into a computer.

In some embodiments the ID checking station may aid the identification of persons of interest, which includes but is not limited to persons having criminal records (including subsets thereof, for example identification of persons having records of violent crimes), persons on "no-fly" lists, or persons wanted by domestic, foreign or international law enforcement agencies. In some embodiments biometric technology is utilized to, for example, scan a customer's fingerprints, retina, facial characteristics or the like. In some embodiments a database is accessed and the personal information on an ID identifier is compared to database entries. In some embodiments the database contains information relating to identification of a person of interest. In some such embodiments the database contains information relating to the suitability of the person for travel, including criminal records, no-fly lists, health issues, and/or a history of disruptive behavior while traveling. Certain embodiments technology including use of passport/ID verification by accessing databases, including remote databases.

In some embodiments information is collected from a customer's ID identifier. In some such embodiments the information may be used to enhance the customer's experience through the security checkpoint. By way of nonlimiting example, the information may indicate that a customer is traveling with family. In such a case, the customer and the customer's family would be kept together through the security checkpoint and/or may be directed to a different security lane or given other special attention. In other embodiments, the information may indicate that the customer is disabled or otherwise requires additional attention through the checkpoint.

In some embodiments the information collected at the ID checking station is communicated to other personnel. For example, the information may be communicated to a gate agent at a travel facility or any other personnel. In some such embodiments the information may be communicated to other personnel at a travel facility. In some such embodiments the information may indicate that a customer is proceeding through the security checkpoint which may prevent the gate agent from filling the customer's seat or may delay take-off until the customer arrives at the gate. In some embodiments such information is communicated to other personnel at the security checkpoint. In some embodiments the information may result in additional screening of the customer at the security checkpoint. In some embodiments such communication may provide additional awareness of who is in the travel facility even if that customer has not otherwise checked-in at the travel facility. For example, a customer having only carry-on baggage would not generally check in until he/she gets to the departure gate. Such information could serve both a security and a customer service function.

Divesting

In some embodiments the security checkpoint methods and systems have a divesting station. In some such embodiments the divesting station is where customers remove personal items, luggage, and the like from their person in anticipation of security screening.

In some embodiments the divesting station includes items to be provided to customers at the security checkpoint. In some such embodiments plastic bags (for example, bags suitable for holding liquids in accordance with TSA regulations) and/or booties/slippers are provided. In some such embodiments the items are items that enhance and/or improve a customer's experience at the security checkpoint. In other embodiments such items are provided at other parts of the security checkpoint. In some embodiments, the materials provided at the divesting stations may carry advertising.

In some embodiments, divesting areas are oriented prior to the physical screening areas and are of various modular sizes to best fit the layout and available space of each unique checkpoint footprint. In some embodiments divesting areas include tables, shelves, conveyors and/or other structures or devices that may assist customers in divesting. Such structures or devices may be of any suitable orientation, size and position and may be ergonomically designed.

In some embodiments personal items may be placed in trays. In some such embodiments, the trays include advertising. In some embodiments the advertising is on an interior surface and in some embodiments the advertising is on an exterior surface. In some embodiments the advertising on the tray may be readily changed and/or altered. In some embodiments the tray advertising may be on electronic display panels, may be either three dimensional or two dimensional and may display digital media content. In such embodiments the advertising on the tray may be remotely controlled and/or coordinated with any other advertising at or around the security checkpoint. In some embodiments advertising may be attached to the trays via vinyl adhesive materials or within a sliding lexan or clear panel.

In some embodiments the trays include information that permits identification of a particular tray. In some such embodiments the trays include identification numbers and/or letters and/or symbols. In some such embodiments the trays include an RFID tag or electronics or a chip. In certain embodiments the trays are made of a lightweight material. In some such embodiments the trays are easily moved and manipulated by customers at the security checkpoint. In some embodiments the bottom surface of the tray is slidable along tables and other surfaces but does not permit substantial movement of the tray once it is placed on a conveyor belt or similar instrumentality as it passes through the screening device. In some such embodiments the tray is able to pass through the lead curtains of an x-ray machine regardless of the overall weight of the tray and its contents.

Security Check

In some embodiments the security checking procedure utilizes the methods and instrumentalities, including security trays having advertising and tray carts, as disclosed in U.S. Pat. No. 6,888,460 and U.S. Patent Application Publication Nos. 2005/0173284, 2007/0126575 and 2007/0132580, the contents of which are expressly incorporated herein by reference. In some embodiments the security checking procedure utilizes SecurityPoint Media, LLC's SecureTray™ system. Other embodiments do not use such instrumentalities or methods.

In some embodiments the security station utilizes one or more screening devices. In some such embodiments the screening device is an x-ray machine (e.g. a multi view advanced technology x-ray machine), a chemical sniffer or trace element detection devise, millimeter wave, a CT scanner, and/or any other suitable device that facilitates inspection of a customer and/or a customer's belongings.

In some embodiments a remote security screening station is also involved in the security checking procedure. In some embodiments the remote security station is located away from the site of the checkpoint. For example, if the checkpoint is at a travel facility, the remote security station may be located at a different location. In other embodiments the remote security station is at the site of the checkpoint. In some embodiments the remote security station oversees and/or reviews customer service personnel and other personnel at the security checkpoint.

In some embodiments the remote security station is configured to receive real-time information from one or more security checkpoints. In some embodiments the remote security station performs a supervisory or review function. For example, the remote security station could review a random sampling of items passing through a security checkpoint or review a particular item when a customer at the security checkpoint so requests. In such an example an employee at the security checkpoint could press a button or the like instead of calling for a supervisor to physically come to the security checkpoint to review the item. In some such embodiments the personnel at the security checkpoint can send specific images to the remote security station for review. In some such embodiments personnel at the security checkpoint may verbally communicate with persons at the remote security station.

In some embodiments the remote security checkpoint may utilize highly-skilled personnel. In some embodiments the highly-skilled personnel are persons having a certain level of experience reviewing items at a security checkpoint, persons who perform higher on certain relevant tests, persons who have otherwise demonstrated relatively high achievement and/or intelligence.

Recomposure

In some embodiments the systems and methods of the present invention include a recomposure area. In some embodiments the recomposure area is the area where customer's collect their personal items and/or put their shoes back on. In some embodiments the recomposure area has a decor and design that is integrated and similar to the design of other parts of the security checkpoint and may comprise benches, chairs, chairs integrated with tables, and couches or sofas. In some embodiments the recomposure area includes signage as described with respect to other parts of the security checkpoint. In certain embodiments the recomposure area includes an element configured to permit one or more customers to place their foot upon the element to facilitate replacement and retying of the customer's shoes. In some embodiments the shoe element is from about 24" to about 48" tall. In some embodiments the recomposure area includes one or more tables or shelves configured such that customers may place personal items upon them without bending over. In some embodiments the tables or shelves are from 48" to 60" tall.

Secondary Screening

In some embodiments the security checkpoint includes a secondary screening station. In some embodiments the secondary screening checkpoint is used to conduct additional screening of a customer. In some embodiments secondary screening occurs because of random selection, an initial positive indication at the security station and/or because a customer has been identified as a person of interest. In some embodiments the secondary screening station is enclosed by glass walls that may be transparent in one configuration or opaque in a second configuration, for example a transition from clear to opaque on demand for creating a multi use area.

Business Models

In some embodiments the present invention includes a method of earning revenue within a security checkpoint. In some embodiments the security checkpoints of the present invention optimize the display of advertising and collecting and distributing revenue from the advertising to offset the operational costs associated with the checkpoint. In this context, optimization of advertising may involve one or more of displaying different advertising directed or segmented to different demographics at different times, displaying different amounts of advertising depending on the volume of the traffic through the security checkpoint (e.g., interchanging or rotating informational signage with advertising during key periods, such as periods of high or low traffic, and/or periods of specific customer demographics, such as during holidays and/or commuter travel times), optimizing the audio and visual characteristics of the advertising presented (including integration of the audio and visual characteristics of the advertising with the audio and visual characteristics of the security checkpoint and/or facility as a whole) and/or coordinating the advertising presented in one part of the security checkpoint with advertising presented at other parts of the checkpoint (for example, coordinating advertising on the screens in one part of the security checkpoint with advertising on screens in other parts of the security checkpoint and/or coordinating the advertising on the screens with the advertising on the security trays, security carts, line stanchions, and/or other items in the security checkpoint and/or facility).

In some embodiments the optimization of advertising provides a method of maximizing the amount of revenue that may be derived from any particular security checkpoint and/or facility. In some embodiments the advertising amount and content may be controlled through a facility remote to the security checkpoint and/or facility. In some embodiments the advertising content is controlled based upon real-time observations of conditions at a particular security checkpoint and/or facility. In some embodiments advertising is controlled via a satellite or wireless system. In some embodiments the advertising is altered to appeal to certain demographics. In this context a demographic may be a particular age group, a group traveling to a particular region or location, a group on a particular flight, a group that speaks a particular language, a group that practices a particular religion, a group having a particular income, leisure travelers, business travelers, or any similar grouping or persons.

In some embodiments a master plan or guidelines are developed with respect to the security checkpoint. In some such embodiments advertising is done in a manner consistent with to the master plan to optimize security and customer service. In some embodiments the master plan or guidelines (or the consulting services described below) place priority on security, customer service second and then advertising revenue. Over emphasis on advertising and revenue generation without regard to operational needs and aligned with a master plan for the security checkpoint may impair or limit the security process.

In some embodiments consulting services are provided. In some such embodiments the consulting services include one or more of creation of a security checkpoint master plan or guidelines, training of customer service personnel, additional training for TSA or similar personnel, design of the security checkpoint (including all aspects as described herein), maximizing advertising revenue, and creation of a security checkpoint that requires no additional finding for maintenance or personnel or upkeep as a result of the advertising revenue it generates.

In some embodiments the facility has the option to elect any amount to no advertising at all, in which cases it may directly pay for the services and/or components that may be provided as contemplated herein. In other embodiments the facility may engage in an arrangement that shares the revenue generated by the advertising at the checkpoint in return for the components and/or services contemplated herein.

In some embodiments all or a portion of the advertising revenue generated by the security checkpoint is used to pay for personnel, upkeep and/or maintenance of the security checkpoint. Such is often the purvey of retail concession or property managers.

In some embodiments the facility is presented with a menu or list of available options to determine and select to best combination of available options and proceed with recommendations from the master plan based on level of ad revenue, available budget, needs at the checkpoint, facility vision, federal state and local requirements and the amount of space and layout design. This menu may be different for different facilities, depending on any of a number of factors, including facility size, budget, type (i.e., airport, cruise line, train) and/or existing components and advertising type and quantity.

In some embodiments the revenues collected from an initial improvement or enhancement of a security checkpoint are used to further optimize, enhance and/or integrate a security checkpoint. In some embodiments such revenues are derived from a system such as SecurityPoint Media, LLC's SecureTray™ system.

Thus, it is seen that methods and systems are provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example configuration for the invention, which is done to aid in understanding the features and functionality that may be included in the invention. The invention is not restricted to the illustrated example configurations, but the desired features may be implemented using a variety of alternative configurations. Indeed, it will be apparent to one of skill in the art how alternative functional, logical or physical configurations may be implemented to implement the desired features of the present invention. Also, a multitude of different names other than those depicted herein may be applied to the various parts or areas of a security checkpoint.

Additionally, with regard to method claims or block diagrams depicting an exemplary method, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A security checkpoint system comprising:
   a line management system comprising a computer;
   an identification checking station; and
   a security station;
   a remote security station located remote to the security station; and
   a recomposure station;
   wherein:
      the computer is configured to track customer progress at the security checkpoint system, calculate, based on the tracked customer progress, a wait time of a line leading to the identification checking station, provide real-time information relating to the wait time to another identification checking station in a secure facility containing the identification checking station and the other identification checking station; and
      the remote security station is configured to:
         receive real-time information from the security station; and facilitate real-time oversight of the security station by remote personnel located at the remote security station.

2. The security checkpoint system of claim 1, wherein the computer is configured to facilitate arranging a customer's appointment for an appearance at a security checkpoint in the facility.

3. The security checkpoint system of claim 1, wherein the computer is configured to provide the identification checking station whether a customer is a person of interest, and the identification checking station is configured to determine whether the person has a criminal record, has a record of violent crimes, is a person on a "no-fly" list, or is a person wanted by domestic, foreign, or international law enforcement agencies.

4. The security checkpoint system of claim 1, wherein the recomposure station comprises one or more elements selected from the group consisting of a shelf, a table, a bench, a post to facilitate a customer's replacement of his/her shoes.

5. The security checkpoint system of claim 1, wherein the computer is configured to receive personal information about a customer and the security checkpoint system comprises a speaker system configured to communicate audio instructions to the customer based on the personal information received by the computer.

6. The security checkpoint system of claim 1, further comprising integrated digital signage, the integrated digital signage including screens configured to display advertising based on real-time observations of conditions near the security station.

7. A security checkpoint system comprising:
a line management system comprising a computer;
integrated digital signage configured to provide advertising and one or more of the group consisting of: travel information, checkpoint information, and a facility identity;
an identification checking station configured to perform one or more functions selected from the group consisting of verification of the authenticity of an ID identifier and determining whether a customer is a person of interest;
a security station, wherein a customer or an item in the customer's possession is inspected; and
a remote security station located remote to the security station, wherein said remote security station inspects the customer or an item in customer's possession;
wherein:
the computer is configured to track customer progress at the security checkpoint system, calculate, based on the tracked customer progress, a wait time of a line leading to an identification checking station, provide real-time information relating to the wait time to another line leading to another identification checking station in a secure facility containing the identification checking station and the other identification checking station; and
the remote security station is configured to:
receive real-time information from the security station; and
facilitate real-time supervision or oversight of the security station by remote personnel located at the remote security station.

8. A security checkpoint system comprising:
a line management system comprising a computer;
an identification checking station;
a plurality of security stations comprising a security station and a remote security station located remote to the security station; and
a recomposure station;
wherein:
the computer is configured to track customer progress at the security checkpoint system, calculate, based on the tracked customer progress, a wait time of a line leading to the identification checking station, provide real-time information relating to the wait time to another identification checking station in a secure facility containing the identification checking station and the other identification checking station; and
the remote security station is configured to:
receive real-time information from the security station; and
facilitate real-time oversight of the security station by remote personnel located at the remote security station.

9. The security checkpoint system of claim 8 wherein the computer is configured to facilitate arranging a customer's appointments for an appearance at a security checkpoint in the facility.

10. The security checkpoint system of claim 8 wherein the line management or queuing system is configured to accommodate a special security process lane.

11. The security checkpoint system of claim 10 wherein the special security process lane is for one or more of the group selected from: Registered Travelers, frequent or preferred or premium customers, employees, and customers having an appointment.

12. The security checkpoint system of claim 8 wherein the computer is configured to provide to the identification checking station whether a customer is a person of interest, and the identification checking station is configured to determine whether the person has a criminal record, has a record of violent crimes, is a person on a "no-fly" list, or is a person wanted by domestic, foreign, or international law enforcement agencies.

13. The security checkpoint system of claim 8 wherein the remote personnel comprises personnel with high or special skill in interpreting images.

14. The security checkpoint system of claim 13 wherein the remote personnel are trained to interpret results of technology images, the technology images comprising as x-ray images.

15. The security checkpoint system of claim 8, wherein the recomposure station comprises one or more elements selected from the group consisting of a specifically designed shelf, a table, a bench, and a leaning post or rail to facilitate a customer's replacement of his/her shoes or articles of clothing.

16. The security checkpoint system of claim 8 wherein the computer is configured to receive personal information about a customer and the security checkpoint system comprises a speaker system configured to communicate audio instructions to the customer based on the personal information received by the computer.

17. The security checkpoint of claim 8 further comprising integrated digital signage, the integrated digital signage including screens configured to display advertising based on real-time observations of conditions near the security station.

18. A security checkpoint system comprising:
a line management system comprising a computer;
integrated digital signage configured to provide advertising and one or more of the group consisting of travel information, checkpoint information, instructions for the security process, and a facility identity;
an identification checking station, wherein the identification checking station is configured to perform one or more functions selected from the group consisting of verification of the authenticity of an ID identifier or biometric verification and determining whether a customer is a person of interest;
a plurality of security stations, wherein a customer or an item in the customer's possession is inspected; and
a remote security station, wherein said remote security station inspects the customer or an item in customer's possession and may be redundant to an on site officer;
wherein:
the computer is configured to track customer progress at the security checkpoint system, calculate, based on the tracked customer progress, a wait time of a line leading to an identification checking station, provide real-time information relating to the wait time to another identification checking station in a secure facility containing the identification checking station and the other identification checking station; and
the remote security station is configured to:
receive real-time information from the security station; and
facilitate real-time oversight of the security station by remote personnel located at the remote security station.

19. A method comprising:
providing a line management system of a security checkpoint system, the line management system comprising a computer, the computer having one or more first processors and first memory coupled to the one or more first processors;
providing an identification checking station of the security checkpoint system;
providing a security station of the security checkpoint system;
providing a remote security station located remote to the security station, the remote security station having one or more second processors and second memory coupled to the one or more second processors;
providing a recomposure station of the security checkpoint system; and
executing first instructions stored on the memory, the first instructions instructing the one or more processors to:
track customer progress at the security checkpoint system;
calculate, using the tracked customer progress, a wait time of a line leading to the identification checking station; and
provide real-time information relating to the wait time to another identification checking station in a secure facility containing the identification checking station and the other identification checking station; and
executing second instructions stored on the second memory, the second instructions instructing the one or more second processors to:
receive real-time information from the security station; and
facilitate real-time oversight of the security station by remote personnel located at the remote security station.

20. A method comprising:
providing a line management system of a security checkpoint system, the line management system comprising a computer, the computer having one or more first processors and first memory coupled to the one or more first processors;
providing integrated digital signage of the security checkpoint system, the integrated digital signage configured to provide advertising and one or more of the group consisting of: travel information, checkpoint information, and a facility identity;
providing an identification checking station of the security checkpoint system, the identification checking station being configured to perform one or more functions selected from the group consisting of verification of the authenticity of an ID identifier and determining whether a customer is a person of interest;
providing a security station of the security checkpoint system, wherein a customer or an item in the customer's possession is inspected at the security station; and
providing a remote security station located remote to the security station, the remote security station having one or more second processors and second memory coupled to the one or more second processors;
providing a remote security station of the security checkpoint system, wherein said remote security station inspects the customer or an item in customer's possession;
executing first instructions stored on the first memory, the first instructions instructing the one or more first processors to:
track customer progress at the security checkpoint system;
calculate, using the tracked customer progress, a wait time of a line leading to an identification checking station; and
provide real-time information relating to the wait time to another identification checking station in a secure facility containing the identification checking station and the other identification checking station; and
executing second instructions stored on the second memory, the second instructions instructing the one or more second processors to:
receive real-time information from the security station; and
facilitate real-time oversight of the security station by remote personnel located at the remote security station.

21. The method of claim 20 further comprising: configuring the security checkpoint to generate revenue for the entity that runs the checkpoint or security area.

22. The method of claim 21 wherein the revenue generated is sufficient to pay for the maintenance or redesign of the security checkpoint.

23. A method comprising:
providing a line management system of a security checkpoint system, the line management system comprising a computer, the computer having one or more first processors and first memory coupled to the one or more first processors;
providing an identification checking station of the security checkpoint system;
providing a plurality of security station of the security checkpoint system;
providing a remote security station located remote to the security station, the remote security station having one or more second processors and second memory coupled to the one or more second processors;
providing a recomposure station of the security checkpoint system; and
executing first instructions stored on the first memory, the first instructions instructing the one or more first processors to:
track customer progress at the security checkpoint system;
calculate, using the tracked customer progress, a wait time of a line leading to the identification checking station; and
provide real-time information relating to the wait time to another identification checking station in a secure facility containing the identification checking station and the other identification checking station; and
executing second instructions stored on the second memory, the second instructions instructing the one or more second processors to:
receive real-time information from the security station; and
facilitate real-time oversight of the security station by remote personnel located at the remote security station.

24. A method comprising:
providing a line management system of a security checkpoint system, the line management system comprising a computer, the computer having one or more first processors and first memory coupled to the one or more first processors;
providing integrated digital signage of the security checkpoint system, the integrated digital signage configured to provide advertising and one or more of the group consisting of: travel information, checkpoint information, and a facility identity;
providing an identification checking station of the security checkpoint system, the identification checking station being configured to perform one or more functions selected from the group consisting of verification of the authenticity of an ID identifier and determining whether a customer is a person of interest;
providing a plurality of security stations of the security checkpoint system, wherein a customer or an item in the customer's possession is inspected at the security station; and
providing a remote security station of the security checkpoint system, wherein said remote security station inspects the customer or an item in customer's possession;
executing first instructions stored on the first memory, the first instructions instructing the one or more first processors to:
track customer progress at the security checkpoint system;
calculate, using the tracked customer progress, a wait time of a line leading to an identification checking station; and
provide real-time information relating to the wait time to another identification checking station in a secure facility containing the identification checking station and the other identification checking station; and
executing second instructions stored on the second memory, the second instructions instructing the one or more second processors to:
receive real-time information from the security station; and
facilitate real-time oversight of the security station by remote personnel located at the remote security station.

* * * * *